L. H. LEWIS.
COMBINATION MEASURING INSTRUMENT.
APPLICATION FILED JUNE 30, 1916.

1,253,399.

Patented Jan. 15, 1918.
2 SHEETS—SHEET 1.

WITNESSES
Howard T. Costello
Wm. H. Milligan

INVENTOR
Leslie H. Lewis
BY Richard B. Owen
ATTORNEY

L. H. LEWIS.
COMBINATION MEASURING INSTRUMENT.
APPLICATION FILED JUNE 30, 1916.

1,253,399.

Patented Jan. 15, 1918.
2 SHEETS—SHEET 2.

WITNESSES
Howard F Costello
Wm H Mulligan

INVENTOR
Leslie H. Lewis
BY Richard Brown
ATTORNEY

UNITED STATES PATENT OFFICE.

LESLIE H. LEWIS, OF CLAREMONT, NEW HAMPSHIRE.

COMBINATION MEASURING INSTRUMENT.

1,253,399.   Specification of Letters Patent.   Patented Jan. 15, 1918.

Application filed June 30, 1916. Serial No. 106,884.

*To all whom it may concern:*

Be it known that I, LESLIE H. LEWIS, a citizen of the United States, residing at Claremont, in the county of Sullivan and State of New Hampshire, have invented certain new and useful Improvements in Combination Measuring Instruments, of which the following is a specification.

This invention relates to a combination measuring instrument and more particularly to an artisan's tool comprising in combination, a square, miter, calipers, a level and line gage.

The primary object of the invention is to provide a single tool, comprising a minimum of parts, but adapted to perform various functions and uses in laying out work of mechanical nature when accurate measurements are necessary.

A further object of the invention resides in the provision in a combination tool of this character adapted to be associated and clamped with a measuring scale and, which may be used in conjunction with the scale in determining the various measurements and adjustments.

The above and additional objects are accomplished by such means as are illustrated in the preferred embodiment and in the accompanying drawings, wherein like characters denote like or corresponding parts throughout the several views, in which:—

Figure 1:
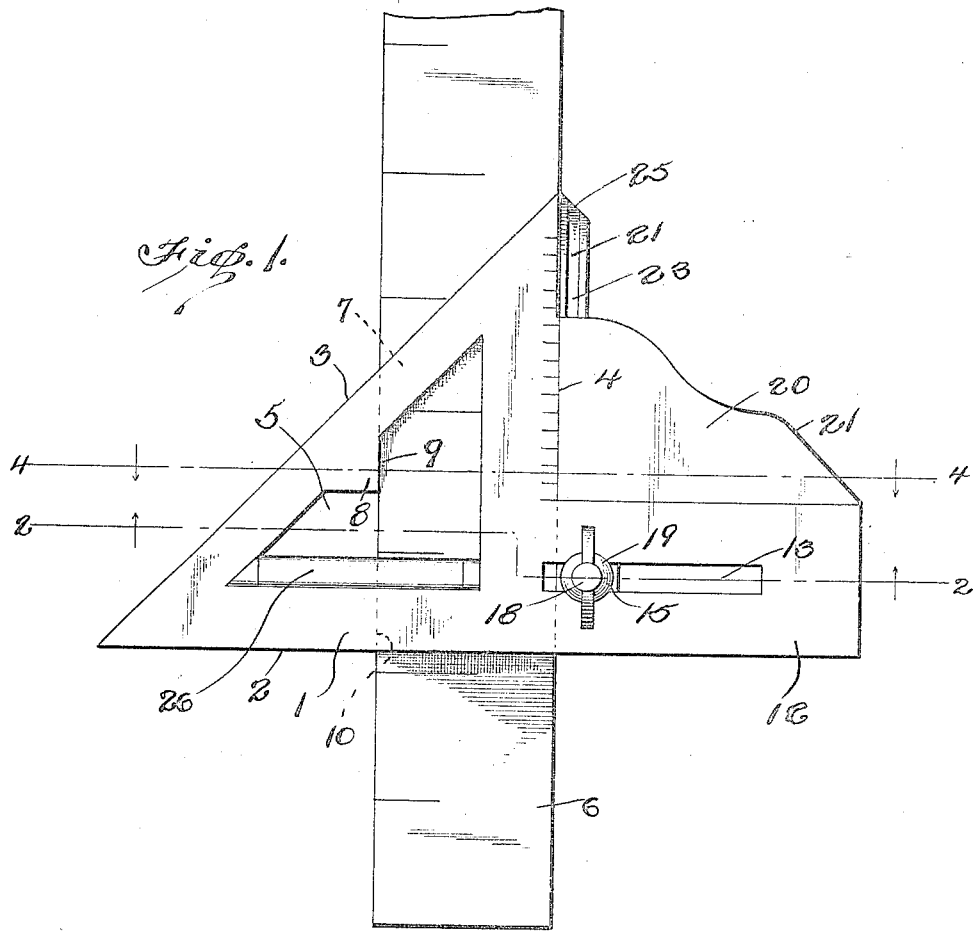
Figure 1 is a top plan view of the instrument showing the same clamped to a scale.
Figure 2:
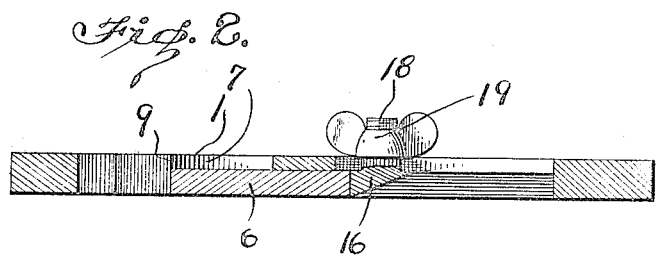
Fig. 2 is a section on the line 2—2 of Fig. 1.

The main portion of the instrument comprises a frame 1 which is designed to constitute a right-angled triangle having the straight edge 2, and a miter edge 3 disposed at an angle of 45 degrees to the straight edge 2. The adjacent edge 4 of the triangle, at right angles to the edge 2, is provided, for a portion of its length, with a plurality of graduations divided into suitable parts of equal distance from each other. The center of the triangular portion is cut out to provide the triangular opening 5.

A steel scale 6 is adapted to be associated with the tool and, in order that the scale may be connected with the triangular portion of the tool, the bottom surface is provided with a depression 7 equal to the width of the scale and in which the scale is arranged so that the tool may be slidably mounted for longitudinal movement on the scale 6. An extension 8 is formed on the frame and provides an elongated edge 9 for the recess 7 thereby permitting a greater contacting surface for the edge of the scale 6. The recess 7 also forms a bearing surface 10 in the lower portion of the triangle which is in alinement with the surface 9. The opposite side of the recess or depression 7 forms a contacting surface 11 for the opposite edge of the scale.

Figure 3:
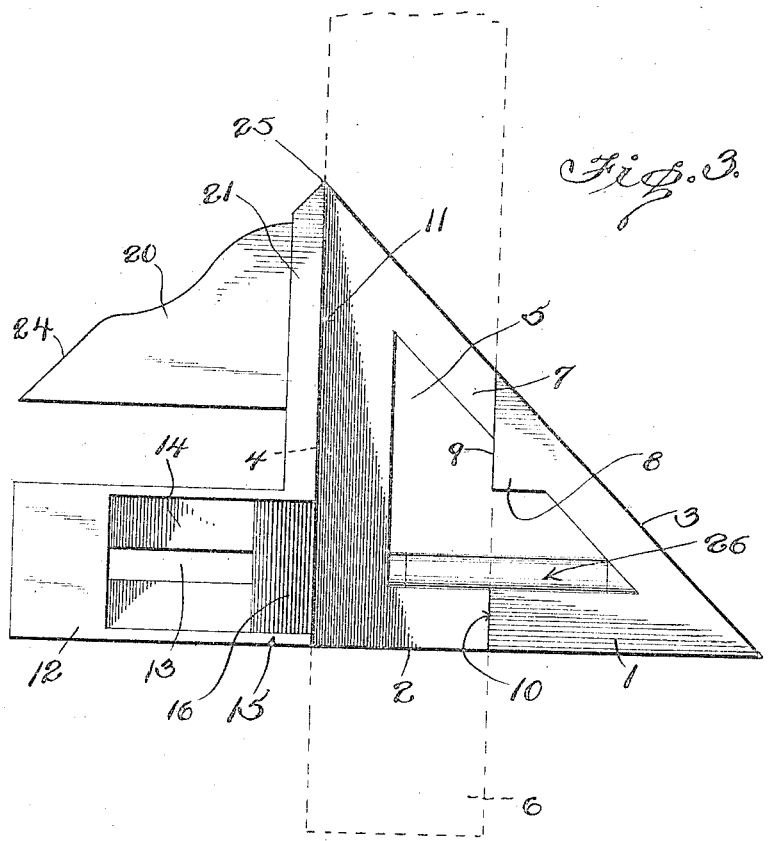
Fig. 3 is a bottom plan view showing the scale in dotted lines.
Figure 4:
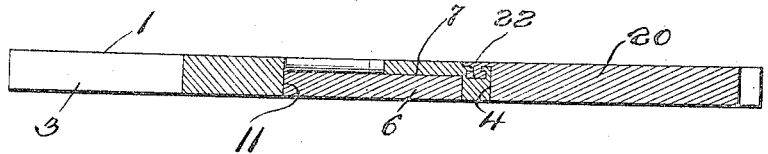
Fig. 4 is a section on the line 4—4 of Fig. 1.
Figure 5:
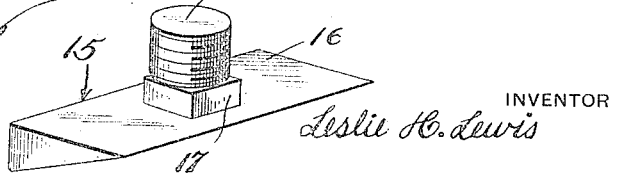
Fig. 5 is a detail perspective view of the clamp element.

In order that the straight edge 2 may be of a substantial length, and also to provide a supporting element for a clamp whereby the scale may be securely held within the recess 7, the edge 4 of the triangle is provided with an extension 12 the lower edge of which is a continuation of the edge 2 of the triangle. A longitudinal slot 13 is formed in the extension and the bottom face of the extension 12 is provided with a depression 14, the side edges of which are disposed in close proximity to the edges of the extension as clearly shown by Fig. 3 of the drawing. Slidably mounted for longitudinal movement in the depression 14 is a clamp 15 which consists of the securing blade 16 of substantially wedge-shape, the widest edge of which is adapted to contact with the edge of the scale 6. An extension is formed on the securing blade 16 and comprises the square shank 17 which extends through the slot 13, and the end of the shank carries a screw threaded stud 18 disposed outwardly beyond the surface of the extension and carries a thumb-nut 19. It will be observed that the recess 14 communicates with the depression 7, thus permitting the clamp to be moved into engagement with the edge of the scale and, when the thumb-nut is tightened after placing the securing blade in engagement with the scale, the scale will be held in clamped engagement with the triangle.

The extension 12 also provides one leg of the calipers which form a part of the tool and the opposite leg of the calipers is provided by a sliding member 20. The edge 4 of the triangle carries a retaining strip 21 of a thickness less than the thickness of the triangle and one end of the sliding member 20 rests upon the strip 21 and the inner edge of the member 20 slides along the edge 4 of the triangle when the calipers are adjusted. For retaining the sliding member 20 which forms the leg of the calipers, in engagement with the strip 21, the member 20 is provided with a tongue 22 which is disposed within the groove 23 formed in the strip 21 and the member 20 is thereby held in engagement with the triangle and permitted to slide toward or away from the extension 12 so that a piece of material may be inserted between the legs of the calipers for determining the thickness or diameter of the piece of material. The graduations on the edge 4 of the triangle indicate at a glance just what distance apart are the legs of the calipers. The edge 24 of the sliding member 20 is disposed at a 45 degree angle with respect to the extension 12 and one end of the strip 21 is also cut at a 45 degree angle as indicated by 25 and, when the parts are in position as shown by Fig. 1 of the drawing, a miter is provided which is suitable to be used in places where an angle of 90 degrees is desired to be measured or determined.

Directly above the straight edge 2 and disposed within the opening 5 is a spirit-level 26 by means of which the edge 2 may be disposed in an accurately horizontal position. This spirit-level will also permit the rule or scale 6 to be disposed in an accurately vertical position as, the scale being at right angles to the edge 2, it is merely necessary to set the straight edge 2 in a horizontal position by means of the spirit-level and the vertical position of the scale is thereby assured.

I claim:

1. In a combination measuring instrument, the combination with a scale and a triangle provided with a recess for receiving the scale, the adjacent edge of the triangle being alined with the edge of the scale, of calipers including an extension formed on the said triangle and a movable member associated with the triangle and movable along the said adjacent edge thereof toward and away from the said extension.

2. In a combination measuring instrument, the combination with a scale, of a triangle associated with the scale and having one of its edges alined with the adjacent edge of the scale, an extension formed on the adjacent edge of the said triangle and projecting beyond the edge of the scale, a clamp slidably associated with the said extension, the said clamp including a fastening element for retaining the clamp in engagement with the edge of the scale, and means slidably associated with the triangle and coöperating with the said extension for forming a caliper.

3. In a combination measuring instrument, the combination with a scale, of a triangle associated with the scale and having one of its edges alined with the adjacent edge of the scale, an extension formed on the adjacent edge of the said triangle and projecting beyond the edge of the scale, a clamp slidably associated with the said extension, the said clamp including a fastening element for retaining the clamp in engagement with the edge of the scale, means slidably associated with the triangle and coöperating with the said extension for forming a caliper, the angularly disposed portion of the said triangle being provided with an extension having an elongated edge adapted to contact with the opposite edge of the said scale.

4. In a combination measuring instrument, the combination with a scale, of a triangle having one of its sides provided with a recess for the reception of the scale, the edge of the scale being disposed in alinement with the adjacent edge of the triangle, an extension formed on said triangle and extending from said adjacent edge, one edge of the extension forming a continuation of the opposite edge of the triangle, said extension being provided with a longitudinal slot communicating with the said recess in the side of the triangle, a clamp slidably arranged on said extension and having a stud extending through said slot and provided with a thumb-nut adapted to hold said clamp in engagement with one edge of said scale, and an extension formed on the angular portion of the said triangle and engageable with the opposite edge of the said scale.

5. In a combination measuring instrument, the combination with a scale, of a triangle provided with a recess for the reception of the scale, the edge of the scale being disposed in alinement with the adjacent edge of the triangle, an extension formed on said triangle and extending from said adjacent edge, one edge of the extension forming a continuation of another edge of the triangle, said extension being provided with a longitudinal slot, a clamp slidably arranged on said extension and having a stud extending through said slot and provided with a thumb-nut adapted to hold said clamp in engagement with one edge of said scale, and means slidably carried by the triangle and coöperating with said extension for providing calipers, the said extension and the said means acting in conjunction to perform the functions of the calipers, the adjacent edge of said triangle being provided with graduations for permitting the reading of said calipers.

6. In a combination measuring instrument, the combination with a scale and a triangle provided with a recess for receiving the scale, the adjacent edge of the triangle disposed in alinement with the edge of the scale and another edge of the triangle disposed at right angles to the scale, calipers formed by a fixed and a movable member carried by said triangle, the said triangle being provided with a strip at its adjacent edge provided with a groove, the said movable member having a tongue associated with the said strip by being disposed in said groove.

7. In a combination measuring instrument, the combination with a scale and a triangle, an extension formed on one edge of the triangle, one edge of the extension being a continuation of one of the edges of the triangle, the said extension being disposed at right angles to the said scale, a retaining strip carried by the triangle and provided with a longitudinal groove, and a slidable member having one edge adapted to engage the proximate edge of the said extension and adapted to be curved toward or away from the said extension for providing calipers.

8. In a combination measuring instrument, the combination with a scale and a triangle, an extension formed on one edge of the triangle, one edge of the extension being a continuation of one of the edges of the triangle, the said extension being disposed at right angles to the said scale, a retaining strip carried by the triangle and provided with a longitudinal groove, and a slidable member having one edge adapted to engage the proximate edge of the said extension and adapted to be curved toward or away from the said extension for providing calipers, the said slidable member having one of its edges disposed at an angle with respect to the said extension, the terminal of the said retaining strip being also cut at the same angle as the angularly disposed edge of the said triangle and extending in the opposite direction therefrom.

In testimony whereof I affix my signature in presence of two witnesses.

LESLIE H. LEWIS.

Witnesses:
IRA G. COLBY,
RUTH P. WALKER.

Copies of this patent may be obtained for five cents each, by addressing the "Commissioner of Patents, Washington, D. C."